(12) United States Patent
Namera

(10) Patent No.: US 8,284,435 B2
(45) Date of Patent: Oct. 9, 2012

(54) DEVICE FOR CONTROLLING DATA STORAGE AND/OR DATA RECONSTRUCTION AND METHOD THEREOF

(75) Inventor: Akihiro Namera, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1661 days.

(21) Appl. No.: 11/657,437

(22) Filed: Jan. 23, 2007

(65) Prior Publication Data
US 2007/0172134 A1  Jul. 26, 2007

(30) Foreign Application Priority Data
Jan. 23, 2006  (JP) .................................. 2006-013971

(51) Int. Cl.
*G06K 15/00*  (2006.01)
(52) U.S. Cl. ................. 358/1.16; 358/1.13; 358/426.05; 358/426.04; 382/232; 382/240
(58) Field of Classification Search .................. 358/1.16, 358/426.04, 426.05, 501, 505; 382/232–253; 711/100
See application file for complete search history.

(56) References Cited

U.S. PATENT DOCUMENTS

| 5,659,631 | A  | * | 8/1997  | Gormish et al.   | 382/166    |
|-----------|----|---|---------|------------------|------------|
| 6,356,665 | B1 | * | 3/2002  | Lei et al.       | 382/240    |
| 6,778,709 | B1 | * | 8/2004  | Taubman          | 382/240    |
| 6,873,734 | B1 | * | 3/2005  | Zandi et al.     | 382/233    |
| 6,904,091 | B1 | * | 6/2005  | Schelkens et al. | 375/240.03 |
| 6,915,015 | B1 | * | 7/2005  | Taubman et al.   | 382/240    |
| 7,139,434 | B2 | * | 11/2006 | Schwartz         | 382/233    |
| 7,433,519 | B2 | * | 10/2008 | Rynderman        | 382/199    |
| 7,580,581 | B2 | * | 8/2009  | Namera et al.    | 382/232    |
| 2001/0000710 | A1 | * | 5/2001 | Queiroz et al.  | 382/264    |
| 2005/0152605 | A1 | * | 7/2005 | Hoogendijk      | 382/232    |

FOREIGN PATENT DOCUMENTS

| JP | 63-099673   |   | 4/1988  |
|----|-------------|---|---------|
| JP | 02-044969   |   | 2/1990  |
| JP | 08-307677   |   | 11/1996 |
| JP | 10-154044   |   | 6/1998  |
| JP | 2002-51221  | A | 2/2002  |
| JP | 2002-57905  | A | 2/2002  |
| JP | 2004-166187 |   | 6/2004  |

OTHER PUBLICATIONS

Feb. 8, 2011 Official Action in JP 2006-013971 corresponding to above-identified application.

* cited by examiner

*Primary Examiner* — Twyler Haskins
*Assistant Examiner* — Dennis Dicker
(74) *Attorney, Agent, or Firm* — Edwards Wildman Palmer LLP; David G. Conlin; David A. Tucker

(57) ABSTRACT

A data storage controlling device including: a data dividing section for dividing target data made by a set of elements, each element being expressed in multiple values, into groups of partial data made by a set of elements, each element being expressed in two values, or dividing target data made by a set of elements, each element being expressed in two values, to partial data made by a subset of the elements; a compression section for generating compressed data blocks by means of reversibly compressing the partial data and of dividing the compressed data into predetermined size of blocks; an identifier assigning section for assigning an identifier for identifying partial data from which the compressed data block is generated to each compressed data block; and a storage processing section for reserving a storage area being smaller than the size of the target data and being common to the partial data and storing the generated compressed data block into the storage area.

16 Claims, 12 Drawing Sheets

Fig.8

DEVICE FOR CONTROLLING DATA STORAGE AND/OR DATA RECONSTRUCTION AND METHOD THEREOF

CROSS-REFERENCE TO RELATED APPLICATION

This application is related to Japanese application No. 2006-013971 filed on Jan. 23, 2006 whose priority is claimed under 35 USC §119, the disclosure of which is incorporated by reference in its entirety.

BACKGROUND OF THE INVENTION

1. Field of the Invention

The present invention relates to a device for controlling data storage and/or a data reconstruction and method thereof. The present invention also relates to an image forming apparatus having the device.

2. Description of the Related Art

In an image forming apparatus such as a digital multi function peripheral, a scanned image is read and converted to a digital image, and the digital image is stored as image data in a storage section. In this case, prior to storage the image data to the storage section, many image forming apparatuses perform a data compression (coding) for reducing the data size of image data. At the time of reading and outputting the compressed and stored image data, a decompression (decoding) is performed to decompress the compressed data to original image data and, after that, a printing process is performed.

For a process of compressing a color image, the JPEG compression method is widely used. However, the JPEG compression is an irreversible process. Therefore the picture quality of an image obtained through JPEG compression and decompression deteriorates as compared with its original. When the JPEG compressed image data is further subjected to an image process, the picture quality further decreases. Consequently, to suppress deterioration in picture quality accompanying the image process after the JPEG decompression, a method is employed, of generating additional data corresponding to each pixel at the time of generating image data, storing the generated additional data so as to be associated with image data, and using the additional data for an image process to be performed later.

The additional data is used at the time of performing an image process, for example, to select a preferable parameter of the image process for a pixel. There is the tendency that the information amount of additional data for each pixel increases as a demand for picture quality increases. That is, the additional data is data related to an image and the number of bits per pixel tends to increase. As the number of bits of the additional data increases, the storage capacity necessary for storing the additional data is becoming unignorable. Consequently, by performing the compression on the additional data prior to storage to a storage section, the storage capacity can be suppressed. However, different from image data, a reversible method is necessary for compressing/decompressing additional data. Since the purpose of additional data is to suppress image deterioration after decompression of irreversibly compressed image data, if the original information of the additional data is lost after decompression, the initial purpose cannot be achieved.

As a reversible compressing/decompressing method for multi-value data, a method such as JPEG2000 is known. However, the compression ratio of the reversible compressing/decompressing method is much lower than that of the irreversible compressing/decompressing method. On the other hand, as reversible compressing/decompressing methods for binary data, MH, MR, MMR, and JBIG methods are well known. By the methods, the compression ratio higher than that of the compressing/decompressing methods for multivalued data can be obtained. The circuit scale necessary for realizing the compression/decompression can be smaller and the processing speed can be faster, in addition. However, in the case of processing multivalued additional data, a mechanism for enabling a compression/decompression section to handle target data as binary data is necessary. Regarding this issue, an approach of providing such mechanism has been proposed. For example, to compress/decompress a plurality of jobs by using single compressing/decompressing means, a method of dividing data of each job line by line and performing time-division process is known (refer to, for example, Japanese Patent Laid-Open No. 2004-166187).

As described above, a device or method capable of compressing multivalued additional data at a high compression ratio is demanded.

However, the compression ratio of additional data depends on an image of corresponding image data. It is difficult to predict the compression ratio before the compression. At the time of the compression, a buffer (storage) area for temporarily storing compressed data has to be reserved. The image data compression/decompression in an image forming apparatus is generally performed on the page unit basis. In this case, additional data corresponding to image data is also compressed/decompressed on the page unit basis. On assumption of the worst case, the size of the buffer area to be reserved for the compression becomes equal to that of original additional data in the case where compression of additional data is not performed at all.

It is however not preferable to occupy an extra memory area only because the compression ratio cannot be predicated. It is empirically known that it is rare that the size of a compressed image becomes the same as that of the original image in the binary image data reversible compression/decompression. In particular, when image data of an original image has sufficiently high resolution, it is substantially impossible that bits of neighboring pixels change in all of the area. Therefore, when binary image data is reversibly compressed, in most of the cases, the size of resultant data becomes smaller than that of original data. Since the additional data expresses the attributes of pixels, a similar result is expected.

If a worst-case value of the compression ratio can be predicted even by empirically, it is sufficient to reserve a buffer area based on the predicted value, thereby saving the memory capacity. Even if the compression ratio as a result of the compression does not reach the predicted value, it is sufficient to reserve an additional storage area at that time. In this case, because a buffer area larger than that in the normal case is assigned for the process of compressing the page, the buffer reservation for the following page may take a certain time. The tradeoff between buffer capacity and processing time is allowable if the frequency is in the permissible range of the user. It is more appropriate than a method of always reserving an extra memory area that is hardly used and is charging the user for the cost.

SUMMARY OF THE INVENTION

The present invention pays attention to the empirical fact and provides a method for effectively utilizing a storage area by compressing data at a high compression ratio before storing the data, and capable of reconstructing original data from the compressed and stored data.

More concretely, the invention provides a method of applying a compressing method for binary data to multivalued data. The invention also provides an additional data dividing method capable of predicting a compression as high as that of binary image data when multivalued data is compressed. The invention also provides a method capable of easily expanding a storage area in the case where a compression ratio predicted before data compression cannot be obtained.

The present invention provides a data storage controlling device including: a data dividing section for dividing target data made by a set of elements, each element being expressed in multiple values, into groups of partial data made by a set of elements, each element being expressed in two values, or dividing target data made by a set of elements, each element being expressed in two values, to partial data made by a subset of the elements; a compression section for generating compressed data blocks by means of reversibly compressing the partial data and of dividing the compressed data into predetermined size of blocks; an identifier assigning section for assigning an identifier for identifying partial data from which the compressed data block is generated to each compressed data block; and a storage processing section for reserving a storage area being smaller than the size of the target data and being common to the partial data and storing the generated compressed data block into the storage area.

Further, the present invention provides an image forming apparatus having the data storage controlling device.

From another viewpoint, the present invention provides a data storage controlling method using a computer including: a step of dividing target data made by a set of elements, each element being expressed in multiple values, into groups of partial data made by a set of elements, each element being expressed in two values, or dividing target data made by a set of elements, each element being expressed in two values, to partial data made by a subset of the elements; a step of reserving a storage area being smaller than size of the target data and being common to partial data; a step of reversibly compressing the partial data and dividing the compressed data into predetermined size of blocks, thereby generating compressed data blocks; a step of assigning an identifier for identifying partial data from which the compressed data block is generated to each compressed data block; and a step of storing the generated compressed data block into the storage area.

Further, the present invention provides a data reconstruction controlling device including: a data reading section for reading a compressed data block from a storage area in which compressed data blocks are stored, the compressed data blocks being obtained by dividing multivalued or binary original data into binary data of a plurality of groups, reversibly compressing the binary data, dividing the compressed binary data into predetermined size of blocks, and assigning an identifier of corresponding group to each compressed data block; a classifying section for classifying the compressed data blocks into the groups on the basis of the identifiers assigned to each compressed data blocks; a decompression section for decompressing the classified compressed data blocks, thereby generating group-by-group data blocks; and a data connecting section for connecting the group-by-group data, thereby reconstructing the original data.

Further, the present invention provides an image forming apparatus having the data reconstruction controlling device.

From another viewpoint, the present invention provides a data reconstruction controlling method using a computer including: a step of reading a compressed data block from a storage area in which compressed data blocks are stored, the compressed data blocks being obtained through the above mentioned data storage controlling method; a step of classifying the compressed data blocks into the groups on the basis of the identifiers assigned to each compressed data blocks; a step of decompressing the classified compressed data blocks, thereby generating group-by-group data blocks; and a step of connecting the group-by-group data blocks, thereby reconstructing the original data.

BRIEF DESCRIPTION OF THE DRAWINGS

FIG. 8 is an explanatory diagram showing an example of a method of dividing additional data expressed as binary data of each pixel to four groups;

DETAILED DESCRIPTION OF PREFERRED EMBODIMENTS

Figure 1:
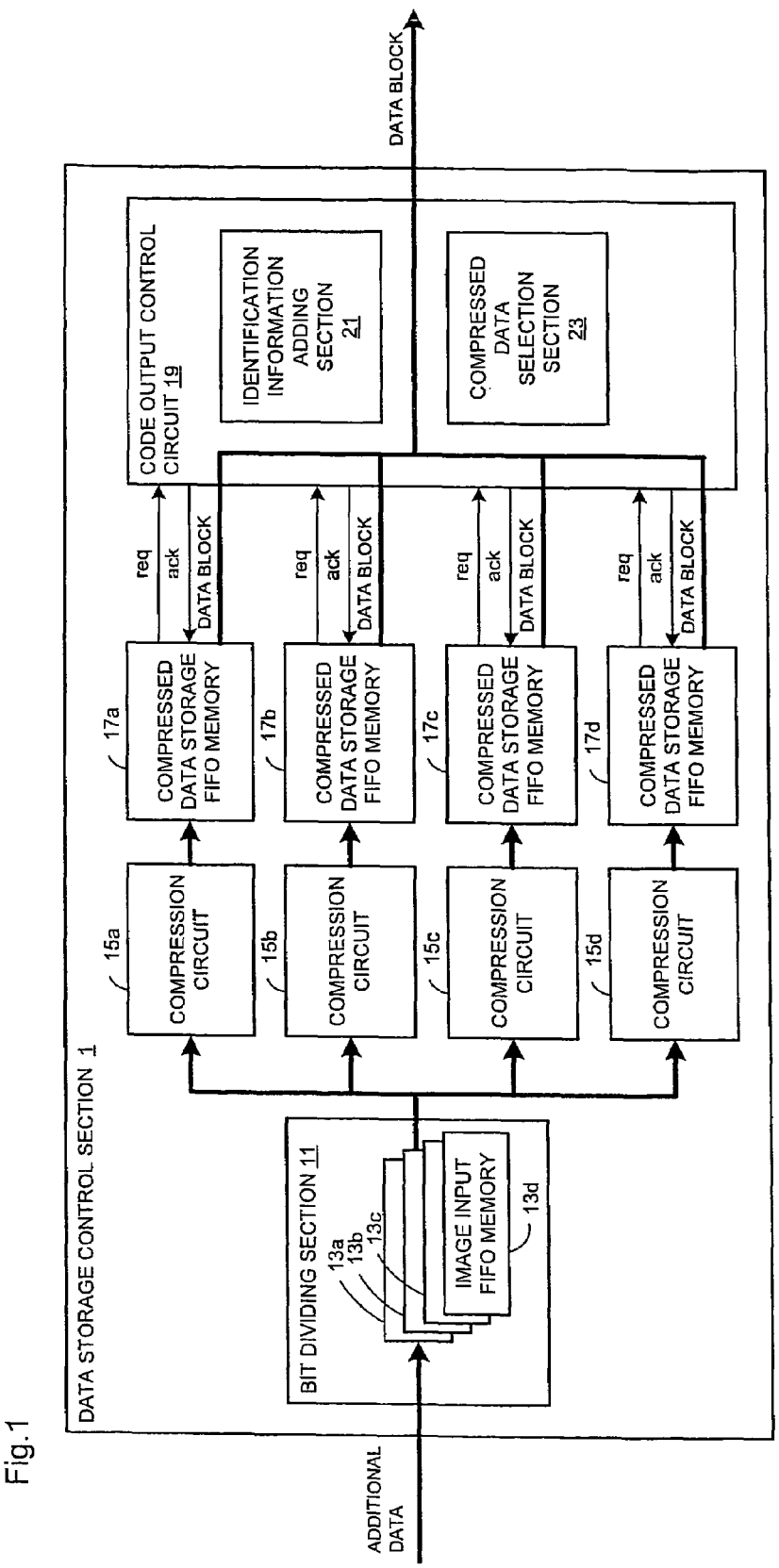
FIG. 1 is a block diagram showing the configuration of a data storage controlling device of the present invention.

Since the data storage controlling device of the present invention includes the data dividing section for dividing target data made by a set of elements, each element being expressed in multiple values, into groups of partial data made by a set of elements, each element being expressed in two values, or dividing target data made by a set of elements, each element being expressed in two values, to partial data made by a subset of the elements and the compression section for generating compressed data blocks by means of reversibly compressing the partial data and of dividing the compressed data into predetermined size of blocks, regardless of whether target data is binary data or multivalued data, a reversible compressing method for binary data can be applied. Therefore, a known binary data compressing method can be applied to multivalued data compression. Since the reversible compressing/decompressing method for binary image data is often used, the compression ratio of target data can be predicted from experiences, a storage area to be reserved is determined based on the predicted compression ratio so that the memory area can be used efficiently.

Although multivalued data is considered mainly as the target data, the target data is not limited to the multivalued data but may be binary data. Although the target data is considered mainly such data that relates to an image, the present invention is not limited to such data. Although two-dimensional data is considered mainly as the target data, the target data may be one-dimensional or three- or more dimensional data. For example, data expressing the attribute of each of points in a three-dimensional coordinate system may be used.

Since the data storage controlling device of the present invention has the compression section for generating compressed data blocks from target data even though data size after compression cannot be predicted, in most of the case, compression can be performed in the reserved storage area of a size smaller than that of original data. Even in the case where the compressed data block cannot be stored in the storage area, the storage area can be easily expanded. Since the storage area is commonly used, it is unnecessary to expand the storage area on the group unit basis. In addition, the compressed data blocks have the predetermined size.

The data storage controlling device of the present invention can use a known reversible compressing/decompressing method for binary image data for the compression section, so that the reliable device can be obtained.

Each of the elements of the target data may be expressed in multiple values by a plurality of bits, and the data dividing section may divide the target data by one bit in the bit depth direction of each element. With this configuration, the target data can be divided into bit-sliced binary data. Consequently, the target data compression can be considered to have characteristics similar to those of the binary data compression, and it is easy to predict the result of the compression from experiences.

The target data may be additional data to be added to image data, and each of elements of the additional data may indicate an attribute of each of pixels of the image data.

Further, the compression section may compress data by using an MH coding method, an MR coding method, an MMR coding method, a JBIG coding method, or a combination of any of the methods.

The number of compression sections may be smaller than the number of groups, the data dividing section may assign a plurality of groups to a single compression section in accordance with the number of groups and the number of compression sections, and the compression section to which the plurality of groups are assigned may compress the partial data in a time division manner.

According to the data storage controlling method of the present invention, target data is divided into groups of binary data, the binary data is compressed and divided every predetermined size into blocks, and compressed data blocks are sequentially generated. Consequently, a reversible coding method for binary data, which has been often used and experienced can be applied. Therefore, the compression ratio of target data can be predicted with high precision, a storage area to be reserved is determined, and the memory area can be efficiently used.

In the data storage controlling method of the present invention, binary data is compressed and divided every predetermined size into blocks, thereby generating compressed data blocks, and the compressed data blocks in groups are stored in the common storage area. Consequently, even if a situation such that the compression ratio which is assumed before the group data compression cannot be obtained occurs, the storage area reserved in advance can be easily expanded.

Since the data reconstruction controlling device of the present invention has the data reading section for reading a compressed data block from a storage area in which compressed data blocks are stored, the compressed data blocks being obtained by dividing multivalued or binary original data into binary data of a plurality of groups, reversibly compressing the binary data, dividing the compressed binary data into predetermined size of blocks, and assigning an identifier of corresponding group to each compressed data block, the classifying section for classifying the compressed data blocks into the groups on the basis of the identifiers assigned to each compressed data blocks and the decompression section for decompressing the classified compressed data blocks, thereby generating group-by-group data blocks, the known binary data decompressing method can be applied to the compression of the compressed data blocks.

The original data may be made of a plurality of elements, each element of the original data is expressed in multiple values by a plurality of bits, and the group-by-group data block may be obtained by dividing the original data by one bit in the bit depth direction of each element.

The original data may be additional data to be added to image data, and each of elements of the additional data may be data indicative of an attribute of each of pixels of the image data.

The compressed data block read from the storage area may be a data obtained using the aforementioned data storage controlling device.

Further, the decompression section may decompress a compressed data block compressed by using an MH coding method, an MR coding method, an MMR coding method, a JBIG coding method, or a combination of any of the methods.

Further, the number of decompression sections may be smaller than the number of groups, the classifying section assigns a plurality of groups to a single decompression section in accordance with the number of groups and the number of decompression sections, and the decompression section to which the plurality of groups are assigned may decompress the compressed data block in a time division manner.

In the data reconstructing method of the present invention, a compressed data block is read from a storage area in which compressed data blocks are stored. The compressed data blocks are obtained by dividing original data into binary data of a plurality of groups, reversibly compressing the binary data, dividing the binary data every predetermined size into blocks, and assigning an identifier of a group to the data of each block. The compressed data blocks are classified into the groups on the basis of the identifiers assigned to the compressed data blocks which are read. The classified compressed data blocks are decompressed, thereby generating group-by-group data blocks. Thus, the known binary data decompressing method can be applied to the decompression of the compressed data blocks.

The present invention will be described in further detail hereinbelow with reference to the drawings. The present invention can be understood more from the following description. The following description is to be considered in all respects as illustrative and not restrictive.

Example of Data Storage Controlling Device

FIG. 1 is a block diagram showing the configuration of a data storage controlling device of the present invention. As shown in FIG. 1, a data storage control section 1 as a data storage controlling device has blocks of a bit dividing section 11, compression circuits 15a, 15b, 15c, and 15d, compressed data storage FIFO memories 17a, 17b, 17c, and 17d, a code output control circuit 19, a compressed data selection section 23, and an identification information adding section 21.

The bit dividing section 11 as a data dividing section divides data input from the outside to partial data corresponding to four groups a, b, c, and d. The compression circuits 15a, 15b, 15c, and 15d as compression sections correspond to the groups a, b, c, and d, respectively and compress data of the corresponding groups. The compressed data storage FIFO memories 17a, 17b, 17c, and 17d as FIFO memories temporarily store data compressed by the compression circuits and store the data up to a predetermined data size. The compressed data selection section 23 as a storage processing section takes a compressed data block of a predetermined size stored in each of the compressed data storage FIFO memories from the compressed data storage FIFO memories and stores the compressed data block to an external memory. The identification information adding section 21 as an identifier assigning section assigns an identifier of the group to compressed data taken from each of the compressed data storage FIFO memories. The code output control circuit 19 reserves a storage area in the memory prior to storage of a compressed data block to the memory. The capacity of the storage area is smaller than that of data input from the outside. The capacity may be a ratio which is preliminarily determined with respect to data input from the outside. The proportion may be determined on the basis of the worst value of a compression ratio empirically obtained.

The bit dividing section 11 has image input FIFO memories 13a, 13b, 13c, and 13d. The image input FIFO memories 13a, 13b, 13c, and 13d function as buffers of respective groups for absorbing the difference between the speed at which data is input to the data storage control section 1 and processing speed at which data is compressed by the compression circuits 15a, 15b, 15c, and 15d. Alternatively, in place of the FIFO memories, data divided into groups may be stored in memory areas reserved as work memories. The code output control circuit 19 is a block including the identification information adding section 21 and the compressed data selection section 23, and performing a process of taking compressed data blocks stored in the compressed data storage FIFO memories, and storing the taken data to an external memory.

The number of groups is not limited to four but may be larger or smaller than four as long as it is plural.

The data storage control section 1 can be realized by, for example, integrating the circuits of the blocks on a semiconductor integrated circuit (LSI). Alternatively, the functions of the blocks may be realized by using a microcomputer to realize part of the functions and executing a control program by the microcomputer.

Example of Data Reconstruction Controlling Device

Figure 2:
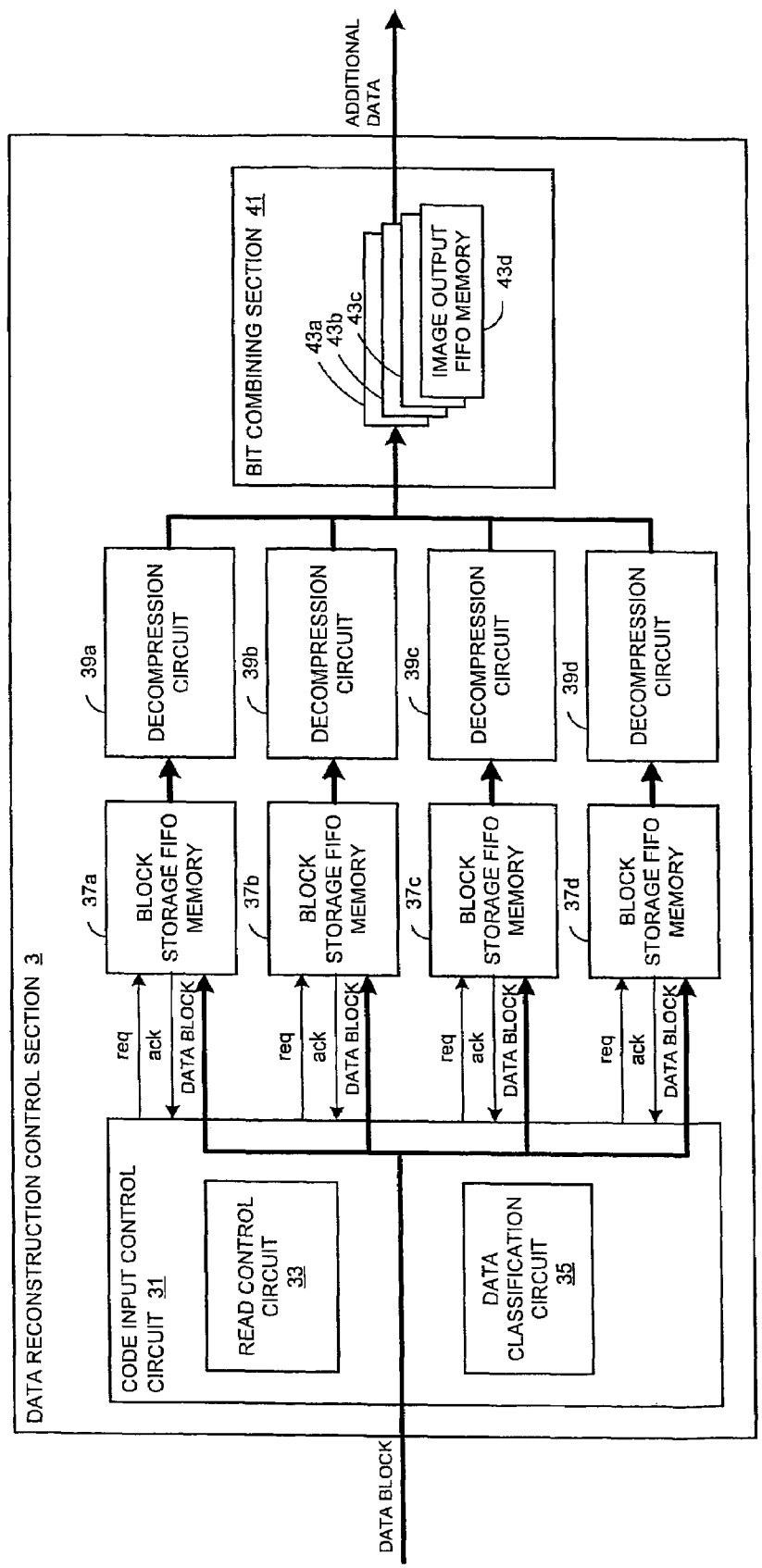
FIG. 2 is a block diagram showing the configuration of a data reconstruction controlling device of the present invention.

FIG. 2 is a block diagram showing the configuration of a data reconstruction controlling device of the present invention. As shown in FIG. 2, a data reconstruction control section 3 as a data reconstruction controlling device has a code input control circuit 31, a read control circuit 33, a data classification circuit 35, data storage FIFO memories 37a, 37b, 37c, and 37d, decompression circuits 39a, 39b, 39c, and 39d, and a bit combining section 41.

The read control circuit 33 as a data reading section reads a compressed data block generated by the data storage control section 1 in FIG. 1 and stored in the external memory. On the basis of an identifier assigned to the read compressed data block, the data classification circuit 35 as a classifying section assigns a decompression section for decompressing the compressed data block. Further, while checking the free area in an FIFO memory corresponding to the assigned decompression section, the data classification circuit 35 stores data to the FIFO memory. The block storage FIFO memories 37a, 37b, 37c, and 37d are buffers for temporarily storing the compressed data blocks assigned to the decompression circuits. The decompression circuits 39a, 39b, 39c, and 39d as decompression sections read stored compressed data from the block storage FIFO memories, and decompress the read compressed data blocks, thereby generating group-by-group data blocks. The bit combining section 41 as a data connecting section connects the group-by-group data blocks, thereby reconstructing the original data.

The bit combining section 41 has image output FIFO memories 43a, 43b, 43c, and 43d. The image output FIFO memories 43a, 43b, 43c, and 43d are group-by-group buffers for absorbing the difference between output speed of the group-by-group data blocks from the data reconstruction control section 3 and processing speed of an external block for receiving the output data. In place of using the image output FIFO memories, the decompressed group-by-group data blocks may be stored in memory areas reserved as work memories. The code input control circuit 31 is a block including the read control circuit 33 and the data classification circuit 35, reading compressed data blocks stored in an external memory, and classifying the read compressed data blocks so as to be assigned to the decompression circuits.

The data reconstruction control section 3 can be realized by, for example, integrating the circuits of the blocks on a semiconductor integrated circuit (IC). Alternatively, the functions of the blocks may be realized by using a microcomputer to realize part of the functions and executing a control program by the microcomputer.

Example of Image Forming Apparatus

Figure 3:
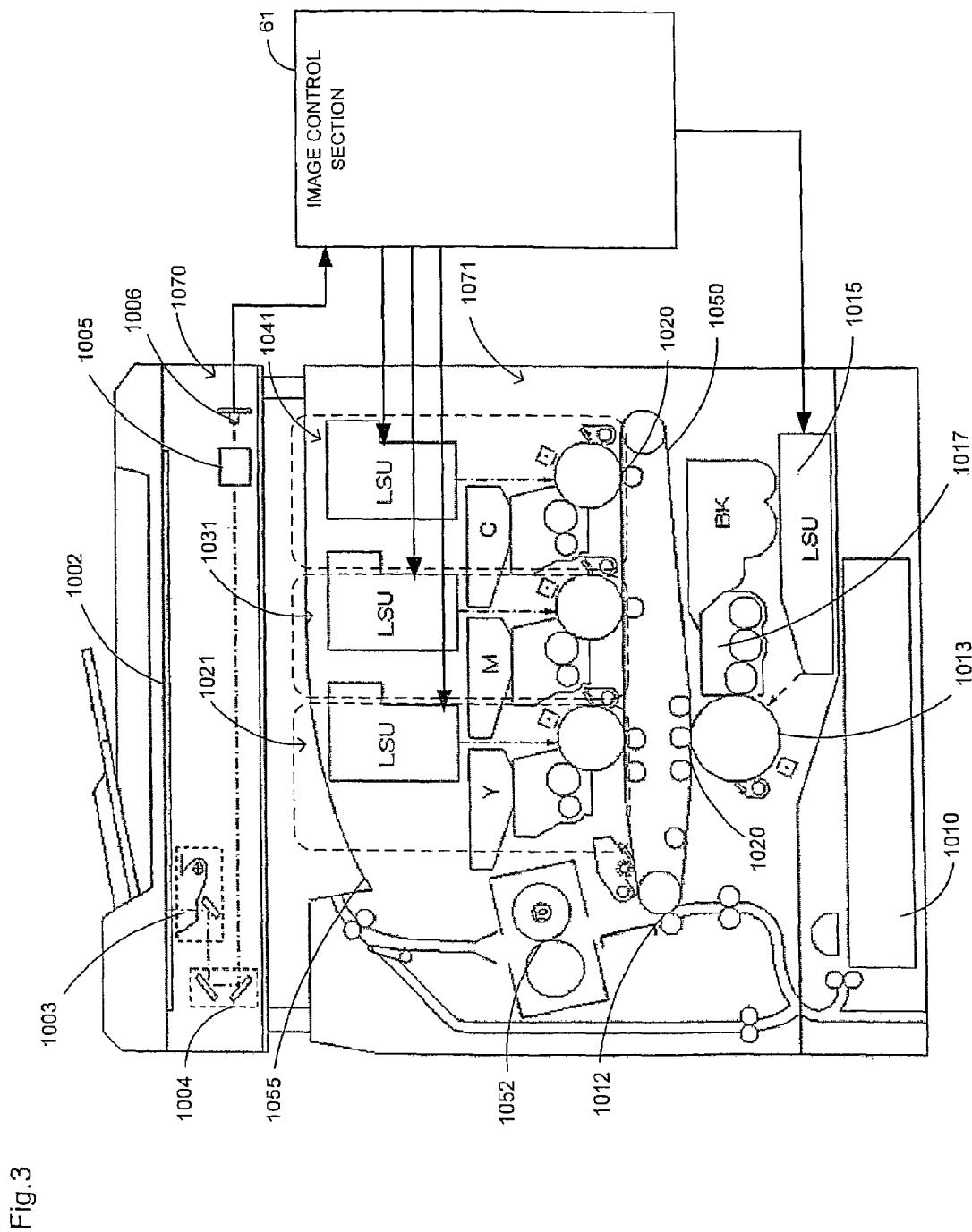
FIG. 3 is an explanatory diagram showing an example of the configuration of a digital full-color multi function peripheral as a mode of an image forming apparatus according to the present invention.

FIG. 3 is an explanatory diagram showing an example of the configuration of a full-color multi function peripheral as an aspect of the image forming apparatus according to the present invention. In the following, the operations of the sections and processes will be described along the flow of data from reading of an original image until output of a printing in the multi function peripheral shown in FIG. 3. An original to be read is mounted on an exposing section 1002 in a scanner section 1070 by the user.

When the user instructs start of reading by using a not-shown operation panel, a first scanning section 1003 scans the reading face of the original and exposes it with light. Light reflected from the original passes through a second scanning section 1004 and an optical lens 1005 and is led to an image sensor 1006. The image sensor 1006 converts an original image formed on the sensor surface to a corresponding electric image signal. In such a manner, the image of the original is converted to the image signal. The obtained image signal is converted to a digital signal by a not-shown signal processing circuit, and the digital signal is converted to multivalued image data. Further, the signal processing circuit generates multivalued additional data corresponding to the image data. The image data and the additional data is input to an image control section 61. The input image data is compressed in the image control section 61 and stored in a memory. On the other hand, the additional data is compressed in the image control section 61 and the compressed data is stored as a compressed data block associated with the image data into the memory.

The image data stored in the memory is decompressed in the image control section 61 so as to be reconstructed to original image data in accordance with a request of the user. Simultaneously, the compressed data block associated with the image data is decompressed and reconstructed to the original additional data. The reconstructed image data is subjected to an image process using the additional data. The image data is converted to data of color components of black, yellow, magenta, and cyan. The converted data is transferred to a laser scanning unit (hereinbelow, called LSU) handling the color components. A printing section (printer) 1071 has an LSU 1015 for black. An LSU for yellow is provided in a yellow image forming unit 1021, an LSU for magenta is provided in a magenta image forming unit 1031, and an LSU for cyan is provided in a cyan image forming unit 1041.

The printing section 1071 in FIG. 3 has a configuration of an electrophotographic full-color printer. Data of black in the data of the color components is used for light emission of a laser device (not shown) in the LSU 1015. The surface of a photoconductor drum 1013 is scanned with a laser beam from the LSU 1015, and an electrostatic latent image is formed on the surface of the photoconductor drum 1013. The formed latent image is developed by a developing section 1017, and toner is adhered in an image area. The toner adhered to the image area in the surface of the photoconductor is transferred onto a transfer belt 1050 in a first transferring section 1020.

Print data of black (K) has been described above. An image forming process is performed also for the colors of yellow (Y), magenta (M), and cyan (C). The toners of the colors are transferred onto the transfer belt 1050. The portions in which the image forming process of the colors of Y, M, and C is performed are the image forming units 1021, 1031, and 1041, respectively, in rectangles drawn by broken lines in FIG. 3. In such a manner, the toners of the colors transferred onto the transfer belt 1050 are transferred onto a sheet of paper fed from a paper tray 1010 in a second transfer section 1012. After that, the transferred toners are fused in a fusing section 1052 and are fixed on the sheet in a state where the colors are mixed. The sheet is output to a paper ejecting section 1055.

Example of Image Control Section

Figure 4:
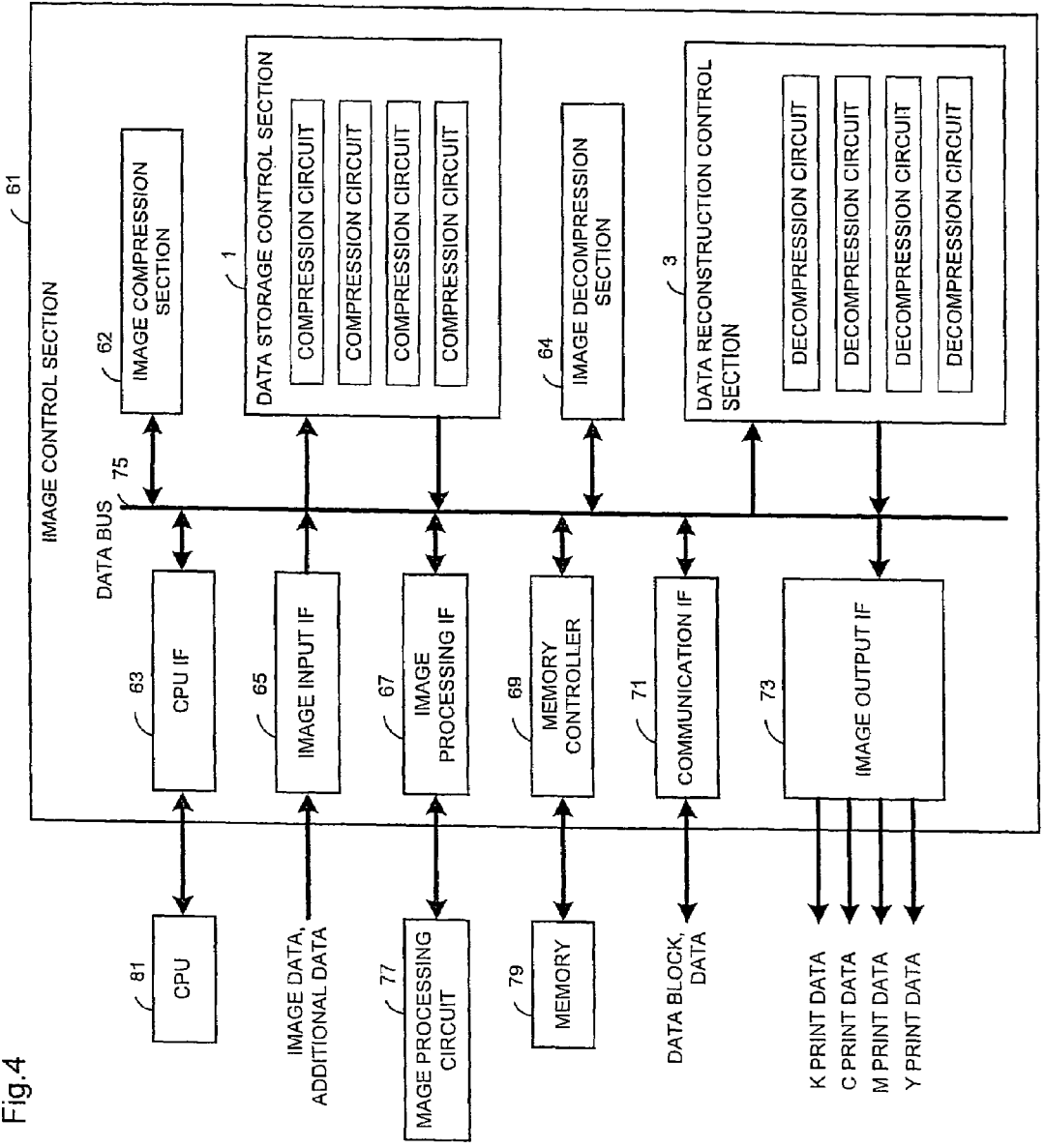
FIG. 4 is a block diagram showing the configuration of an image control section for processing image data to be dealt by the image forming apparatus according to the present invention.

FIG. 4 is a block diagram showing the configuration of an image control section 61 for processing image data handled by the image forming apparatus of FIG. 3. The image control section 61 in FIG. 4 processes an image read by the scanner section 1070 in FIG. 3, stores the processed image into a memory, and reads the image data stored in the memory. The image control section 61 also processes the image to data which can be printed by the printing section 1071 in FIG. 3 or processes print data received from the outside to data which can be printed by the printing section 1071.

As shown in FIG. 4, the image control section 61 has an image input I/F 65, an image compression section 62, the data storage control section 1, a memory controller 69, an image decompression section 64, the data reconstruction control section 3, an image processing I/F 67, an image output I/F 73, a communication I/F 71, and a CPU I/F 63.

The image input I/F 65 performs an interfacing operation of receiving image data and additional data from the scanner section 1070 on the outside shown in FIG. 3 and transferring the received data to the data storage control section 1 or the like via a data bus 75. The image compression section 62 compresses the image data transferred via the image input I/F 65. The data storage control section 1 compresses the additional data transferred via the image input I/F 65 and generates a compressed data block. The memory controller 69 controls writing/reading of data to/from an external memory 79 for storing the image data compressed by the image compression section 62 and the compressed data block generated by the data storage control section 1.

The image decompression section 64 decompresses the image data read from the external memory 79 and reconstructs original image data. The data reconstruction control section 3 decompresses the compressed data block read from the memory 79 in correspondence with the image data, thereby reconstructing the original data. The image processing I/F 67 interfaces image data to/from an external image processing circuit 77 for processing the image data decompressed by the image decompression section 64 and the additional data reconstructed by the data reconstruction control section 3. The image output I/F 73 is used to transfer data to the external printing section 1071 shown in FIG. 3. The communication I/F 71 interfaces commands related to control on the compressed data and image data to/from the outside. The CPU I/F 63 interfaces between an external CPU 81 for instructing and controlling operations of the blocks of the image control section 61 and transmission/reception of data and the data bus 75.

The data storage control section 1 corresponds to the data storage control section 1 in FIG. 1. The data reconstruction control section 3 corresponds to the data reconstruction control section 3 in FIG. 2. The data storage control section 1 and the data reconstruction control section 3 perform process of compressing/decompressing additional data by using the MH coding method. The method is an example, and the compressing/decompressing operation may be performed also by the MR coding method, MMR coding method, JBIG coding method, or a combination of any of the methods. The image compression section 62 and the image decompression section 64 compress/decompress image data by using the JPEG compressing method. The method is an example and the present invention is not limited to the method.

In the embodiment, the image control section 61 is realized as the circuits integrated on a single LSI. The present invention however is not limited to the configuration. The image control section 61 may be constructed by a plurality of LSIs or may be integrated with an external block such as the image processing circuit 77.

Additional Data Compression/Decompression

Figure 5:
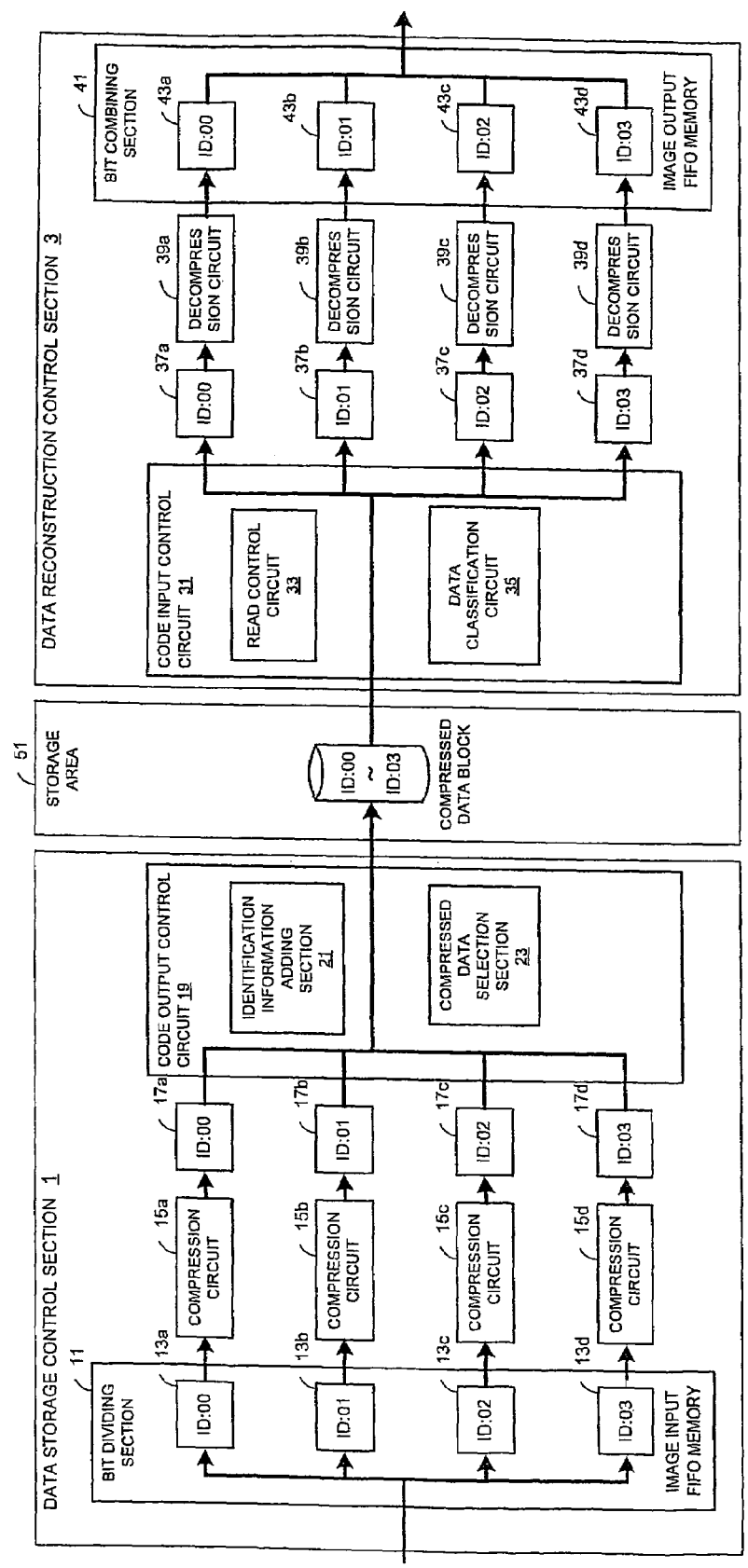
FIG. 5 is an explanatory diagram showing an example of the procedure of image data compression/decompression according to the present invention.

FIG. 5 is an explanatory diagram showing an example of the procedure of image data compression/decompression according to the present invention. As shown in FIG. 5, additional data divided by the bit dividing section 11 in response to an instruction from the CPU 81 is input to the image input FIFO memories 13a, 13b, 13c, and 13d on the group unit basis. The group-by-group additional data input to the image input FIFO memories is compressed by the compression circuits 15a, 15b, 15c, and 15d corresponding to the groups, and the compressed data is input to the corresponding compressed data storage FIFO memories 17a, 17b, 17c, and 17d, respectively. For example, the additional data divided as the group "b" is input to the image input FIFO memory 13b and compressed by the compression circuit 15b.

When data of predetermined size is accumulated in each of the compressed data storage FIFO memories 17a, 17b, 17c, and 17d, the compressed data selection section 23 takes the accumulated data from the compressed data storage FIFO memories 17a, 17b, 17c, and 17d in accordance with requests from the compressed data storage FIFO memories 17a, 17b, 17c, and 17d. The identification information adding section 21 assigns an identifier (ID) of the group to the taken data. In such a manner, compressed data blocks with identifiers are prepared. Further, the compressed data selection section 23 controls the compressed data blocks with identifiers so as to be stored in a storage area 51 reserved in the memory 79. For example, ID01 corresponding to the group "b" is assigned to a compressed data block generated from the group "b" and the compressed data block with ID01 is sequentially stored in the storage area 51. The storage area 51 is an area common to the groups "a", "b", "c", and "d".

Figure 6:
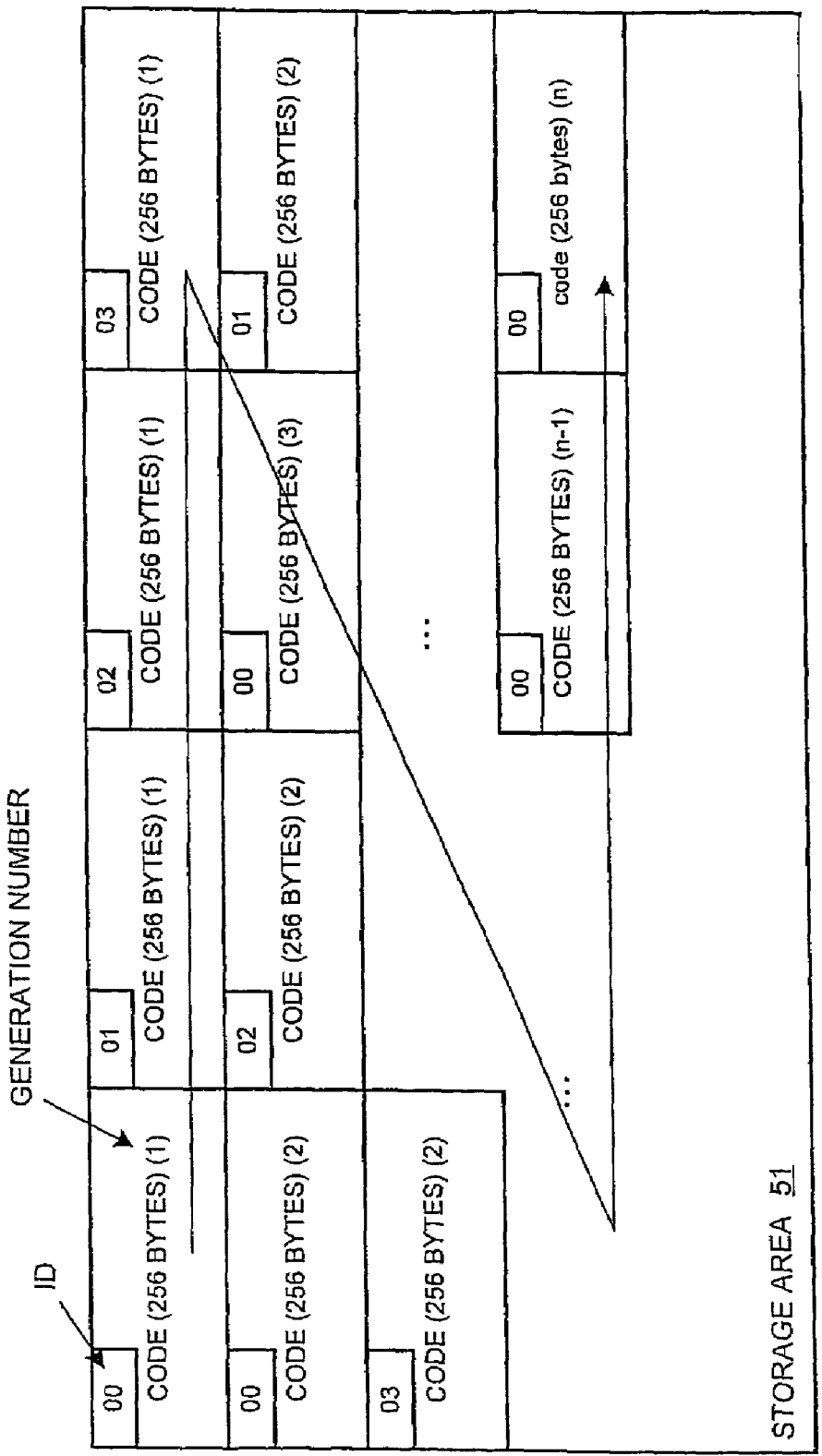
FIG. 6 is an explanatory diagram showing the format of a compressed data block to be stored in a compressed data storage area in the present invention.

FIG. 6 is an explanatory diagram showing a format of a compressed data block stored in the storage area 51. As shown in FIG. 6, the data size after compression of one compressed data block is 256 bytes. This is an example, and the present invention is not limited to the size. To each of the compressed data blocks, the identifier of the corresponding group is assigned as the ID by the identification information adding section 21. The ID "00" corresponds to the group "a", 01 corresponds to the group "b", 02 corresponds to the group "c", and 03 corresponds to the group "d".

The compressed data blocks are generated on the group unit basis by the compression process circuits 15a, 15b, 15c, and 15d. The compressed data selection section 23 controls so as to store the compressed data blocks in the storage area 51 in order of generation. The IDs of the compressed data blocks stored in the memory area do not have regularity because time in which one compressed data block is generated depends on an original image. Specifically, when it is assumed that the speeds of performing the compression of partial data of the groups are equal to each other among the groups, an amount of data output from the compression circuit in a group in which blocks of original image data compressed at low compression ratio are continued is larger than that of the other groups, and reaches 256 bytes as the unit of the compressed data block more quickly. The degree of compression of each of the compressed data blocks depends on the original image. Specifically, depending on a portion in the original image, which is subjected to the compression, the speed at which the compressed data blocks are generated varies. Therefore, in the case where a plurality of compression circuits perform the compression in parallel, the order of storing compressed data blocks is not constant among the groups but depends on the original image. In this sense, there is no regularity.

The code output control circuit 19 may assign generation numbers indicative of the order of generation to compressed data blocks having the same ID. With respect to the compressed data blocks having the same ID, the compressed data blocks having the same ID are stored in the storage area 51 in the order of generation of the compressed data blocks. Therefore, by sequentially reading the compressed data blocks from the head address of the storage area 51, the compressed data blocks can be read in the order of generation. Consequently, even if the generation numbers are not assigned, the order of the compressed data blocks before storage and that after reading are the same. The assigned generation numbers are used just for confirmation.

By storing the compressed data blocks in the format as shown in FIG. 6, even if a situation occurs such that the compression ratio initially predicted cannot be obtained and a preliminarily reserved buffer area becomes short during a compression, it is easy to cope with the situation. In this case, it is sufficient to reserve an additional storage area and store compressed data blocks in the area. Since the buffer area is a common area for the groups, it is unnecessary to reserve an additional area. The added area may not have a continuous address. For example, at the time of storing compressed data blocks into the buffer area, it is sufficient for the code output control circuit 19 to manage the address of a storage destination with a pointer. The compressed data blocks are sequentially stored from the head of the buffer area, and it is sufficient to use the pointer indicative of the storage destination address of the following compressed data block. When the code output control circuit 19 determines that the end address after storage of compressed data blocks exceeds the end address of the preliminarily reserved buffer area, it is sufficient to store the compressed data blocks from the head address of the added buffer area.

As described above, according to the present invention, addition of a buffer area can be easily realized.

Referring again to FIG. 5, in the case of performing printing process on the basis of an instruction of the CPU 81 on image data stored in the storage area 51 in the memory 79, the read control circuit 33 controls so as to sequentially read compressed data blocks stored in the storage area 51 in correspondence with the image data. The data classification circuit 35 inputs the read compressed data blocks to the block storage FIFO memory (one of the codes 37a, 37b, 37c, and 37d) corresponding to the ID assigned to the compressed data blocks. For example, the compressed data block to which "01" is assigned as the ID is input to the block storage FIFO memory 37b preliminarily associated with the ID. The input compressed data block is subjected to decompression in the decompression circuit 39b corresponding to the block storage FIFO memory 37b and the resultant data is output as group-by-group data block of the group "b". The output group-by-group data block is stored in the image output FIFO memory 43b.

The bit combining section 41 connects the group-by-group data blocks stored in the image output FIFO memories 43a, 43b, 43c, and 43d in the bit depth direction to thereby convert the data to single piece of data. In such a manner, the original additional data is reconstructed.

Binarization of Multivalued Additional Data

As described above, the additional data is data corresponding to image data, and each element has information corresponding to a pixel in the image data. A method of dividing the additional data which is multivalued data into groups will be described in further detail.

Figure 7:
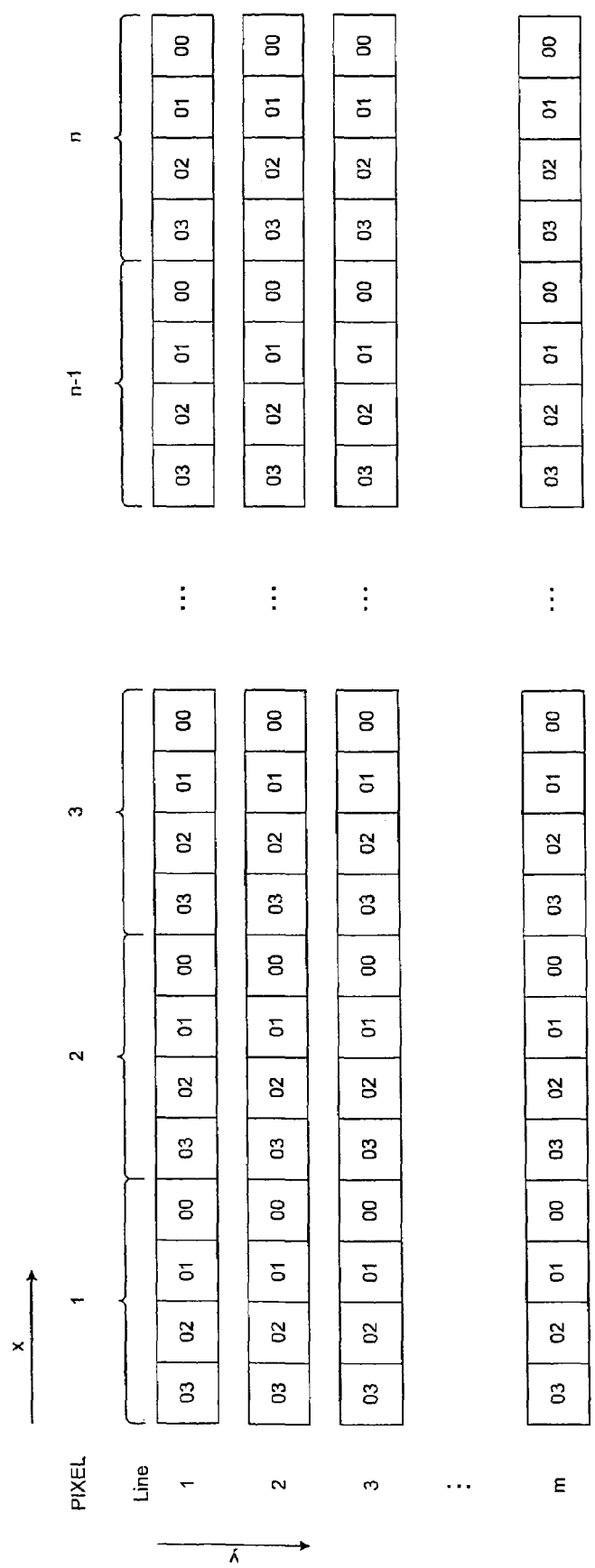
FIG. 7 is an explanatory diagram showing an example of a method of dividing additional data into groups.

FIG. 7 is an explanatory diagram showing an example in which the bit dividing section 11 divides additional data into groups. In the example of FIG. 7, elements of additional data expressed in four bits per pixel are divided into four groups in the bit depth direction, and each group is handled as binary data.

In FIG. 7, the arrow "x" in the horizontal direction corresponds to the main scan direction of image data, and the arrow "y" in the vertical direction corresponds to an image data sub-scan direction. The number of pixels in the main scan direction is "n", and the number of pixels in the sub scan direction is "m". For easier understanding, the numbers of 1 to n in the main scan direction and 1 to m in the sub scan direction are given to the pixels. An element corresponding to one pixel is expressed by four bits. A rectangular frame corresponds to one bit. Specifically, the numbers written in the rectangles are bit numbers of the elements of the additional data, and four bits of 00, 01, 02, and 03 correspond to one element.

In the case of dividing additional data on the bit unit basis in the bit depth direction, the bit numbers correspond to numbers of divided groups. Therefore, the bit numbers 00, 01, 02, and 03 correspond to the groups a, b, c, and d, respectively.

Modification of Division of Additional Data

FIG. 7 shows that multivalued additional data is divided in the bit depth direction. However, the additional data is not limited to multivalued data but may be binary data. A modification of division will be described below.

Figure 8:
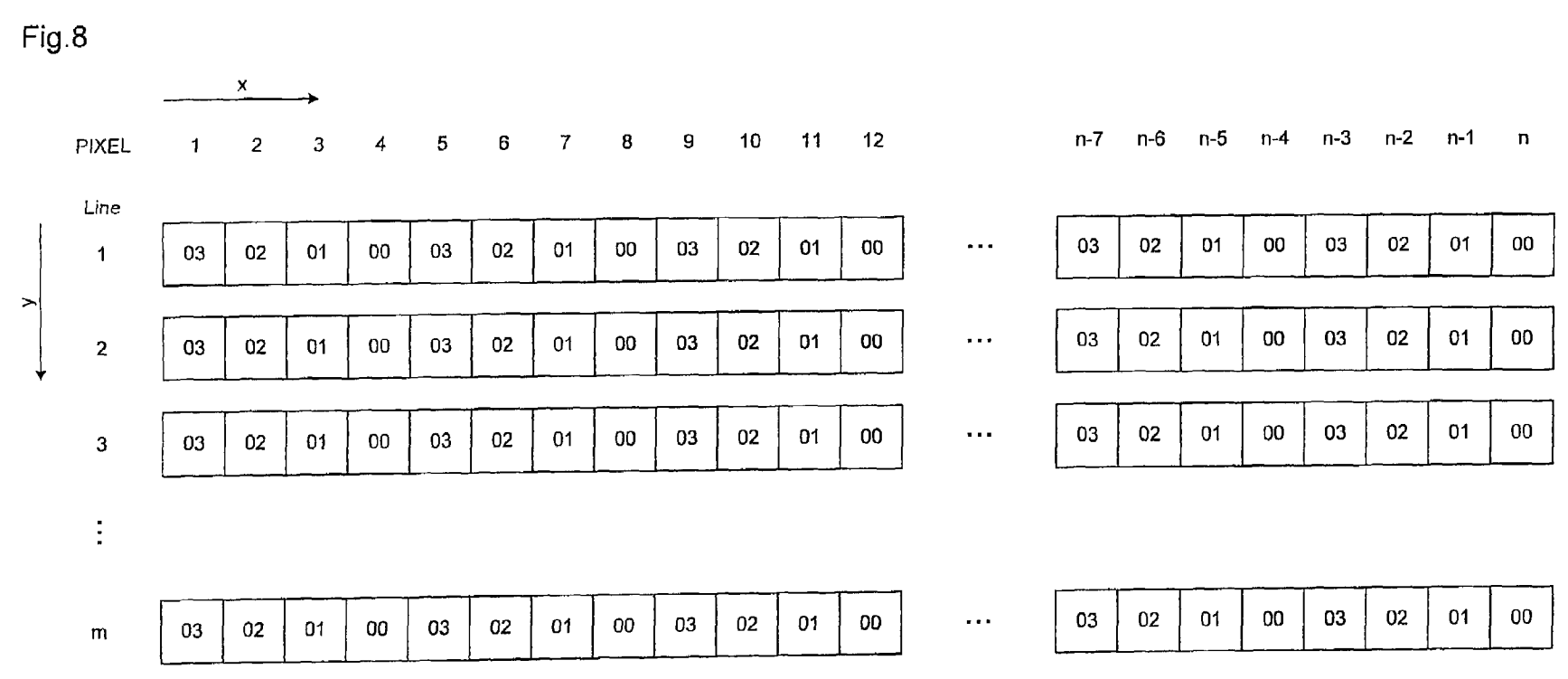

FIG. 8 is an explanatory diagram showing an example in which the bit dividing section 11 divides additional data expressed in two values per pixel into four groups. In a manner similar to FIG. 7, the number of pixels in the main scan direction is "n", and the number of pixels in the sub scan direction is "m". However, the number of bit per element is one. In this case, IDs of 00, 01, 02, and 03 are cyclically assigned to bits corresponding to pixels neighboring in the scan direction, thereby dividing the additional data into four groups. In the example of FIG. 8, the bits belonging to the same group are elements arranged every four pixels in the main scan direction.

Figure 9:
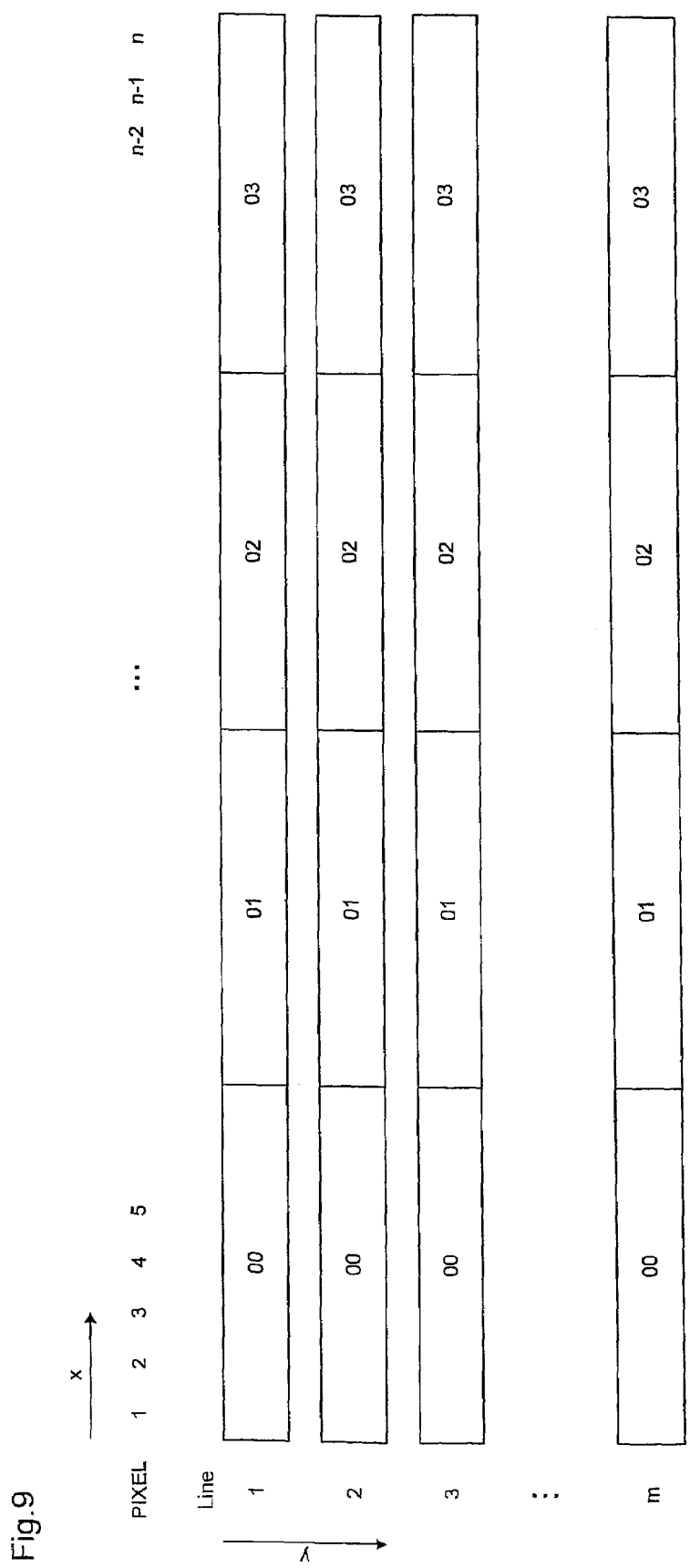
FIG. 9 is an explanatory diagram showing another example of a method of dividing additional data expressed as binary data of each pixel to four groups.

FIG. 9 is an explanatory diagram showing another example in which the bit dividing section in FIG. 1 divides additional data expressed in two values per pixel into four groups. In FIG. 9, the number of pixels in the main scan direction is "n", and the number of pixels in the sub scan direction is "m". The number of bit corresponding to one pixel is one. In the example of FIG. 9, a plurality of pixels neighboring in the main scan direction are arranged to form one group, and the data is divided so that each group of the number of bits obtained by equally dividing the number of bits in the main scan direction into four. Specifically, the group 00 is made of n/4 bits having the pixel numbers of 1 to n/4 in the main scan direction. The group 01 is made of n/4 bits having the pixel numbers of (n/4)+1 to n/4 in the main scan direction. The group 02 is made of n/4 bits having the pixel numbers of (n/2)+1 to 3n/4 in the main scan direction. The group 03 is made of n/4 bits having the pixel numbers of (3n/4)+1 to n in the main scan direction.

In the example of FIG. 9, one line in the main scan direction is equally divided into four. The unit of an object to be divided is not limited to one line but may be the number of bits of one burst at the time of accessing the memory 79. The number of unit bits of a burst is determined by the configuration of the data bus 75, the memory 79, and the memory controller 69.

Figure 10:
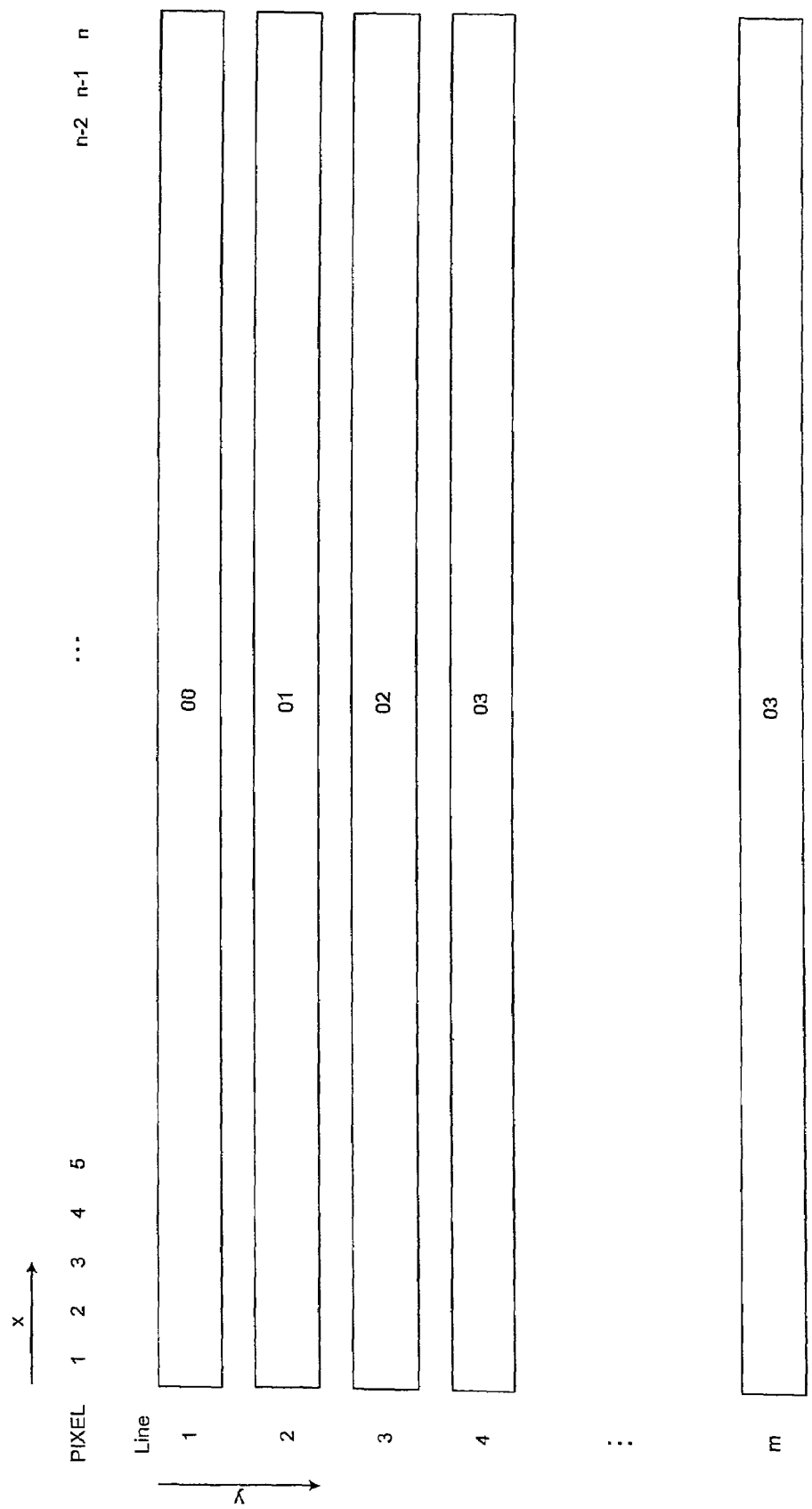
FIG. 10 is an explanatory diagram showing further another example of a method of dividing additional data expressed as binary data of each pixel to four groups.

Further, FIG. 10 is an explanatory diagram showing further another example in which the bit dividing section 11 divides additional data expressed in two values per pixel into groups. In FIG. 10, the number of pixels in the main scan direction is "n", and the number of pixels in the sub scan direction is "m". In the example of FIG. 9, each line in the main scan direction is set as one group, IDs 00, 01, 02, and 03 are cyclically assigned to lines neighboring in the sub scan direction, thereby dividing the additional data into four groups. In the example of FIG. 10, the bits in the same group are data in each line arranged every four lines in the sub scan direction.

Example in Which the Number of Compression Circuits and the Number of Decompression Circuits are Different from Each Other In an embodiment shown in FIG. 5, the number of compression circuits is four, the number of decompression circuits is four, and the numbers are equal to each other. The present invention can be also applied to the case where the number of compression circuits and the number of decompression circuits are different from each other. For example, a case will be considered in which a digital multi function peripheral has four compression circuits and four decompression circuits, and two decompression circuits are occupied for receiving operation of the facsimile function. In this case, the digital multi function peripheral compresses additional data generated from an original to be copied by using the four compression circuits, and uses the two decompression circuits which are not used for the receiving operation of the facsimile function, for the printing process.

There is also a case in which compression and decompression of additional data is performed by different digital multi function peripherals. In this case, the number of compression circuits in the multi function peripheral for performing compression and the number of decompression circuits of the multi function peripheral for performing decompression may be different from each other. For example, there is a mode in which additional data is stored as a compressed data block in the storage area 51 of the multi function peripheral which performed compression. After that, the compressed data block is transferred to another digital multi function peripheral connected via a communication line via the communication I/F 71, and is decompressed in the another digital multi function peripheral.

Figure 11:
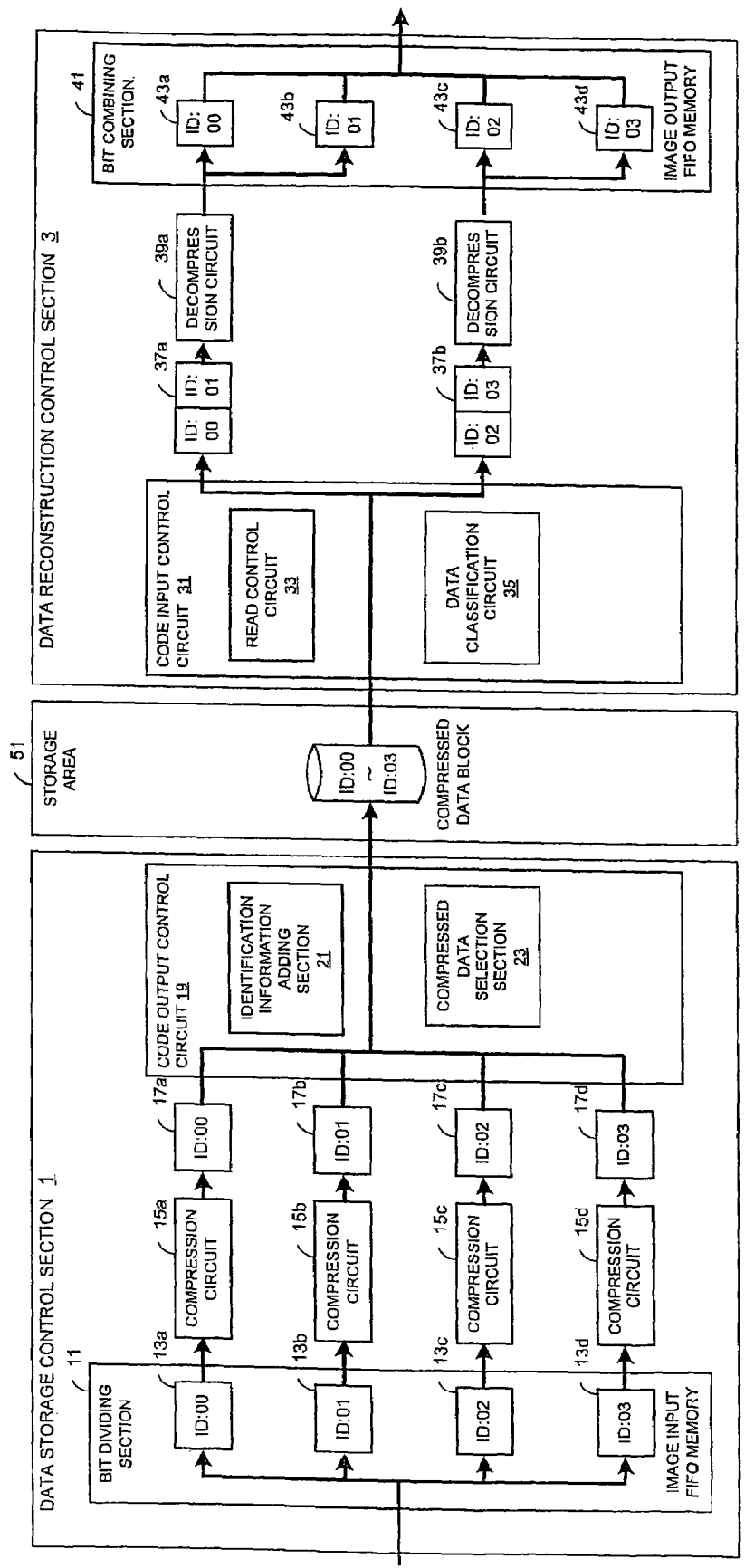
FIG. 11 is an explanatory diagram showing an example of the case where the number of compression circuits is larger than that of decompression circuits in the present invention.

FIG. 11 is an explanatory diagram showing an example of the case where the number of compression circuits is larger than the number of decompression circuits in the present invention. In FIG. 11, the number of compression circuits is four, and the number of decompression circuits is two. The number of groups is four. In FIG. 11, the procedure of dividing additional data, compressing divided data, and storing the compressed data block to the storage area 51 in the memory 79 is similar to that of FIG. 5.

In the case of decompressing the compressed data blocks stored in the storage area 51 in the memory 79 by two decompression circuits on the basis of an instruction of the CPU 81, the read control circuit 33 sequentially reads the compressed data blocks stored in the storage area 51. The data classification circuit 35 recognizes that the number of groups is four from the IDs assigned to the read compressed data blocks. When the data classification circuit 35 recognizes that the number of groups is larger than the number of the decompression circuits 37a and 37b which can be used, the data classification circuit 35 determines assignment to block storage FIFO memories corresponding to the IDs assigned to the compressed data blocks under that condition. The data classification circuit 35 determines assignment on the basis the number of groups and the number of usable decompression circuits. Preferably, the number of groups assigned to the decompression circuits is determined almost uniformly. When the number of groups and the number of decompression process circuits are preliminarily limited, an assignment pattern according to the combination may be determined in advance.

In FIG. 11, the data classification circuit 35 assigns the IDs 00 and 01 to the decompression circuit 39a and assigns the IDs 02 and 03 to the decompression circuit 39b.

Each block storage FIFO memory is constructed so as to be used by being divided in accordance with the number of groups assigned. For example, the block storage FIFO memory 37a is used for the two groups having the IDs 00 and 01, the area of the FIFO memory is divided into two portions and the two portions are used as FIFO memories independent of each other. From the viewpoint of data processing speed, preferably, each of the divided FIFO areas is larger than 256 bytes as the size of a compressed data block, and it is considered to reserve an FIFO memory area having a sufficiently large size in advance. However, this is not a necessary condition. The data classification circuit 35 divides the block storage FIFO memory 37a into two portions and controls so as to assign one of the divided FIFO areas as a compressed data block of the ID 00 and to assign the other area as a compressed data block of the ID 01. The decompression circuit 39a is controlled so as to be assigned to the decompressions of ID00 and D101 in a time division manner. The decompression circuit 39a inputs decompressed group-by-group data block of ID00 to the image output FIFO memory 43a, and inputs decompressed group-by-group data block of ID01 to the image output FIFO memory 43b.

The block storage FIFO memory 373b to which the IDs 02 and 03 are assigned inputs group-by-group data block of ID02 to the image output FIFO memory 43c, and inputs group-by-group data block of ID03 to the image output FIFO memory 43d.

The bit combining section 41 connects the group-by-group data blocks stored in the image output FIFO memories 43a, 43b, 43c, and 43d in the bit depth direction, thereby converting the data to a single piece of data. In such a manner, the original additional data is reconstructed.

Figure 12:
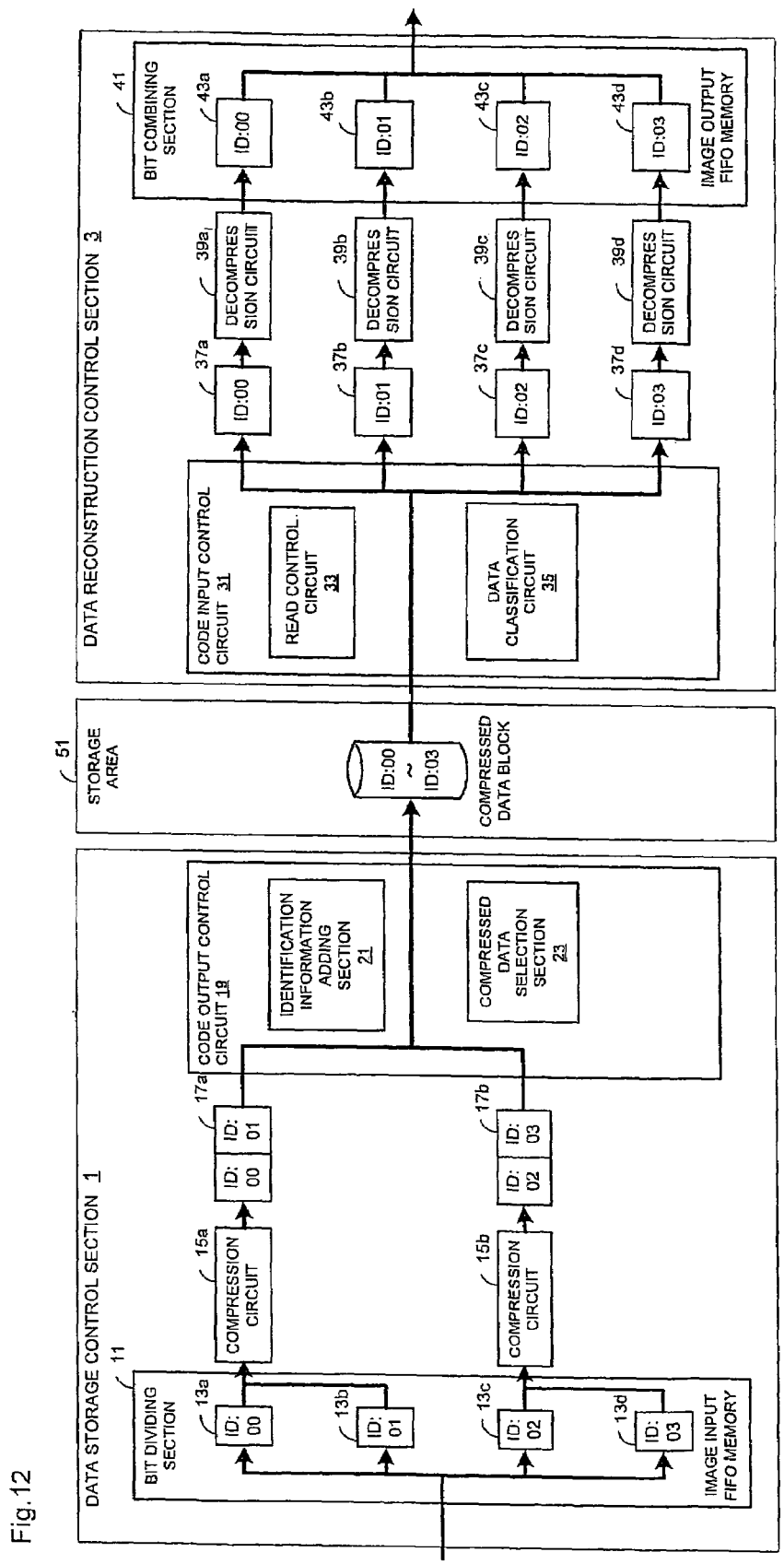
FIG. 12 is an explanatory diagram showing an example of the case where the number of compression circuits is smaller than that of the decompression circuits in the present invention.

FIG. 12 is an explanatory diagram showing an example of the case where the number of compression circuits is smaller than the number of decompression circuits in the present invention. In FIG. 12, the number of compression circuits is two, the number of decompression circuits is four, and the number of groups is four.

When it is determined that the number of the usable compression circuits 17a and 17b is smaller than the predetermined number of groups, the bit dividing section 11 determines assignment to the compression circuits corresponding to groups under the condition. The bit dividing section 11 determines assignment on the basis of the number of groups and the number of compression circuits. It is preferable to determine assignment so that the numbers of groups assigned to the decompression circuits are almost equal. If the number of groups and the number of decompression circuits are limited in advance, an assignment pattern according to the combination may be determined in advance.

In the example of FIG. 12, the bit dividing section 11 assigns the IDs 00 and 01 to the compression circuit 15a, and assigns the IDs 02 and 03 to the compression circuit 15b.

Each compressed data storage FIFO memory is constructed so as to be used by being divided in accordance with the number of groups assigned. For example, the compressed data storage FIFO memory 17a is used for the two groups having the IDs 00 and 01, the area of the FIFO memory is divided into two portions and the two portions are used as FIFO memories independent of each other. The bit dividing section 11 divides the compressed data storage FIFO memory 17a into two portions, assigns one of the divided FIFO area as the compressed data block of ID00, and assigns the other area as the compressed data block of ID01. The compression circuit 15a is controlled so as to be assigned to the compressions of ID00 and ID01 in a time division manner. The compression circuit 17a inputs the compressed data block of ID00 to the compressed data storage FIFO memory 17a prepared for ID00, and inputs the compressed data block of ID01 to the compressed data storage FIFO memory. 17b prepared for ID01.

When data having predetermined size is stored in a compressed data storage FIFO memory, the compressed data selection section 23 takes the stored data from the compressed data storage FIFO memory. The identification information adding section 21 adds the identifier (ID) of the group to the taken data. Further, the compressed data selection section 23 stores the compressed data block to which the identifier is assigned into the storage area 51 reserved in the memory 79.

The procedure of the process of reading the compressed data block stored in the storage area 51, decompressing the read block, and connecting bits, thereby generating original additional data is similar to that of FIG. 5.

Finally, it is obvious that various modifications of the present invention other than the above-described embodiment are possible. It is to be considered that such modifications belong to the features and scope of the present invention. All changes that fall within meets and bounds of the claims, or equivalence of such meets and bounds are intended to embraced by the claims.

What is claimed is:

1. A data storage controlling device comprising:
   a data dividing section for dividing target data made by a set of elements, each element being expressed in multiple values, into groups of partial data made by a set of elements, each element being expressed in two values;
   a compression section for generating compressed data blocks by means of reversibly compressing the partial data and of dividing the compressed data into a predetermined size of blocks;
   an identifier assigning section for assigning an identifier for identifying the partial data from which a compressed data block is generated to each compressed data block; and
   a storage processing section for reserving a storage area that is smaller than a size of the target data and is common to the partial data and storing the generated compressed data blocks in the storage area,
   wherein each of the elements of the target data is expressed in multiple values by a plurality of bits that correspond to the partial data, respectively, each of the partial data is made by the bits,
      the data dividing section divides each element of the target data into the plurality of bits in a bit depth direction of the multiple values, and
      all the bits of each partial data are the same in the bit depth direction.

2. The data storage controlling device according to claim 1, wherein the target data is additional data to be added to image data, and each of elements of the additional data indicates an attribute of each of pixels of the image data.

3. The data storage controlling device according to claim 1, wherein the compression section compresses data by using an MH coding method, an MR coding method, an MMR coding method, a JBIG coding method, or a combination of any of the methods.

4. The data storage controlling device according to claim 1, wherein the number of compression sections is smaller than the number of groups,
   the data dividing section assigns a plurality of groups to a single compression section in accordance with the number of groups and the number of compression sections, and
   the compression section to which the plurality of groups are assigned compresses the partial data in a time division manner.

5. An image forming apparatus comprising the data storage controlling device according to claim 1.

6. A data reconstruction controlling device comprising:
   a data reading section for reading a compressed data block from a storage area in which compressed data blocks are stored, the compressed data blocks being obtained using the data storage controlling device according to claim 1;
   a classifying section for classifying the compressed data blocks into the groups on the basis of the identifiers assigned to each compressed data blocks;
   a decompression section for decompressing the classified compressed data blocks, thereby generating group-by-group data blocks; and
   a data connecting section for connecting the group-by-group data, thereby reconstructing the original data.

7. The data reconstruction controlling device according to claim 6, wherein the original data is made of a plurality of elements, each element of the original data is expressed in multiple values by a plurality of bits, and the group-by-group data block is obtained by dividing the original data by one bit in the bit depth direction of each element.

8. The data reconstruction controlling device according to claim 7, wherein the original data is additional data to be added to image data, and each of elements of the additional data is data indicative of an attribute of each of pixels of the image data.

9. The data reconstruction controlling device according to claim 7, wherein the decompression section decompresses a compressed data block compressed by using an MH coding method, an MR coding method, an MMR coding method, a JBIG coding method, or a combination of any of the methods.

10. The data reconstruction controlling device according to claim 6, wherein
the number of decompression sections is smaller than the number of groups,
the classifying section assigns a plurality of groups to a single decompression section in accordance with the number of groups and the number of decompression sections, and
the decompression section to which the plurality of groups are assigned decompresses the compressed data block in a time division manner.

11. An image forming apparatus comprising the data reconstruction controlling device according to claim 6.

12. A data storage controlling method using a computer comprising:
a step of dividing target data made by a set of elements, each element being expressed in multiple values, into groups of partial data made by a set of elements, each element being expressed in two values;
a step of reserving a storage area smaller than a size of the target data and common to the partial data;
a step of reversibly compressing the partial data and dividing the compressed data into a predetermined size of blocks, thereby generating compressed data blocks;
a step of assigning an identifier for identifying the partial data from which a compressed data block is generated to each compressed data block; and
a step of storing the generated compressed data block in the storage area,
wherein each of the elements of the target data is expressed in multiple values by a plurality of bits that correspond to the partial data, respectively,
each of the partial data is made by the bits,
the data dividing section divides each element of the target data into the plurality of bits in a bit depth direction of the multiple values, and
all of the bits of each partial data are the same in the bit depth direction.

13. A data reconstruction controlling device comprising:
a data reading section for reading a compressed data block from a storage area in which compressed data blocks are stored, the compressed data blocks being obtained by dividing multivalued or binary original data into binary data of a plurality of groups, reversibly compressing the binary data, dividing the compressed binary data into predetermined size of blocks, and assigning an identifier of corresponding group to each compressed data block according to claim 12;
a classifying section for classifying the compressed data blocks into the groups on the basis of the identifiers assigned to each compressed data blocks;
a decompression section for decompressing the classified compressed data blocks, thereby generating group-by-group data blocks; and
a data connecting section for connecting the group-by-group data, thereby reconstructing the original data.

14. A data reconstruction controlling method using a computer comprising:
a step of reading a compressed data block from a storage area in which compressed data blocks are stored, the compressed data blocks being obtained through the data storage controlling method according to claim 12;
a step of classifying the compressed data blocks into the groups on the basis of the identifiers assigned to each compressed data blocks;
a step of decompressing the classified compressed data blocks, thereby generating group-by-group data blocks; and
a step of connecting the group-by-group data blocks, thereby reconstructing the original data.

15. A data storage controlling device comprising:
a data dividing section for dividing target data made by a set of elements, each element being expressed in two values, into partial data made by a subset of the elements;
a compression section for generating compressed data blocks by means of reversibly compressing the partial data and of dividing the compressed data into a predetermined size of blocks;
an identifier assigning section for assigning an identifier for identifying the partial data from which the compressed data block is generated to each compressed data block; and
a storage processing section for reserving a storage area that is smaller than a size of the target data and is common to the partial data and storing the generated compressed data blocks in the storage area,
wherein each of the elements of the target data is expressed in multiple values by a plurality of bits that correspond to the partial data, respectively, each of the partial data is made by the bits,
the data dividing section divides each element of the target data into the plurality of bits in a bit depth direction of the multiple values, and
all the bits of each partial data are the same in the bit depth direction.

16. A data storage controlling method using a computer comprising:
a step of dividing target data made by a set of elements, each element being expressed in two values, into partial data made by a subset of the elements;
a step of reserving a storage area smaller than a size of the target data and common to the partial data;
a step of reversibly compressing the partial data and dividing the compressed data into a predetermined size of blocks, thereby generating compressed data blocks;
a step of assigning an identifier for identifying the partial data from which the compressed data block is generated to each compressed data block; and
a step of storing the generated compressed data block in the storage area,
wherein each of the elements of the target data is expressed in multiple values by a plurality of bits that correspond to the partial data, respectively,
each of the partial data is made by the bits,
the data dividing section divides each element of the target data into the plurality of bits in a bit depth direction of the multiple values, and
all of the bits of each partial data are the same in the bit depth direction.

* * * * *